(12) United States Patent
Patta

(10) Patent No.: US 12,327,458 B1
(45) Date of Patent: Jun. 10, 2025

(54) ONLINE GAMING SECURITY AND GAME PROTECTION SYSTEMS AND METHODS

(71) Applicant: Julius Patta, Henderson, NV (US)

(72) Inventor: Julius Patta, Henderson, NV (US)

( * ) Notice: Subject to any disclaimer, the term of this patent is extended or adjusted under 35 U.S.C. 154(b) by 261 days.

(21) Appl. No.: 18/206,043

(22) Filed: Jun. 5, 2023

Related U.S. Application Data

(63) Continuation of application No. 18/118,719, filed on Mar. 7, 2023, now abandoned.

(60) Provisional application No. 63/317,314, filed on Mar. 7, 2022.

(51) Int. Cl.
*G07F 17/32* (2006.01)
*G06Q 20/40* (2012.01)
*G06Q 50/34* (2012.01)

(52) U.S. Cl.
CPC ......... *G07F 17/3241* (2013.01); *G06Q 20/40* (2013.01); *G06Q 50/34* (2013.01); *G07F 17/3244* (2013.01)

(58) Field of Classification Search
CPC . G07F 17/3241; G07F 17/3244; G06Q 20/40; G06Q 50/34
USPC .......................................................... 463/25
See application file for complete search history.

(56) References Cited

U.S. PATENT DOCUMENTS

| | | | | |
|---|---|---|---|---|
| 8,758,109 B2* | 6/2014 | Lutnick | ............... | G07F 17/3293 463/16 |
| 11,837,048 B2* | 12/2023 | Lutnick | ............... | G07F 17/3241 |
| 12,112,598 B2* | 10/2024 | Snippen | ............... | G07F 17/3232 |
| 2013/0102372 A1* | 4/2013 | Lutnick | ............... | G07F 17/3276 463/13 |
| 2017/0249806 A1* | 8/2017 | Lutnick | ............... | G07F 17/3293 |
| 2020/0160666 A1* | 5/2020 | Lutnick | ............... | G07F 17/3239 |
| 2021/0295648 A1* | 9/2021 | Lutnick | ............... | G07F 17/3225 |
| 2023/0005328 A1* | 1/2023 | Snippen | ............... | G07F 17/3209 |
| 2024/0046751 A1* | 2/2024 | Lutnick | ............... | G07F 17/3276 |

* cited by examiner

*Primary Examiner* — Pierre E Elisca
(74) *Attorney, Agent, or Firm* — Newman Law, LLC

(57) ABSTRACT

Systems and method for Internet-based online gaming platform which incorporates a security and game protection system and method for verification of player awards, where play is suspended and award is held until a significant award is verified and where upon successful verification award is processed and play is enabled.

1 Claim, 7 Drawing Sheets

FIG. 6

ONLINE GAMING SECURITY AND GAME PROTECTION SYSTEMS AND METHODS

BACKGROUND OF THE INVENTION

The invention relates to systems and methods configured to provide for security and game protection in online gaming operations, and more particularly to systems and methods which provide for security and gaming protection in online gaming operations that include a game award verification feature.

In the gaming industry, particularly in online gaming which often involves large payout awards, there is a continuing need for security and game protection features to protect players and gaming operators from game malfunctions, tampering and breaches.

SUMMARY OF THE INVENTION

The invention is generally directed to systems and methods which address the issues cited above, among other things.

In some embodiments, the invention is directed to systems and methods for enabling award verification which are configured to respond to a player receiving a game outcome having a payout award being an amount greater than a preset notification amount, by: disabling or suspending further play of an online game for the player and distribution of the payout award; transmitting notification to an online gaming operator of the payout amount being greater than the preset notification amount; enabling the online gaming operator to actuate a game outcome and payout award validation and/or authentication verification process, which may include a game outcome recreation; and responsive to the verification process confirming the game outcome and payout award, distributing the payout award to the player and releasing the suspension, enabling or unsuspending further play of the online game for the player.

In some embodiments, system and methods of the invention are directed to the generation of an award verification demonstration using a verification analysis system in communication with a game server.

In some embodiments, the invention is directed to a system and method comprising: a verification analysis system configured to monitor a plurality of executable game play codes generated by a game engine in communication with a random number generator generating random output responsive to receiving a game play activation signal from a remote user device during a game session of an interactive wagering game, a game server configured to receive the plurality of executable game play codes and enact a plurality of wagering game events based on the plurality of the executable game play codes to determine a game outcome, wherein one or more of the plurality of wagering game events is displayed on a remote user display device, and at least one of the one or more of the plurality of wagering game events displayed on the remote user display device is the game outcome of a winning event in the interactive wagering game, the winning event being associated with an award having an award value to be credited to a player account; determining, via the verification analysis system monitoring the plurality of game events enacted by the game server, whether one of the award value is greater than a threshold award value; the verification analysis system: identifying the transaction identification associated with the winning event; retrieving the plurality of executable game play codes generated by the game engine associated with the transaction identification and subsequent to receiving the game play activation signal; actuating the game server to generate a recreation of wagering game events using the retrieved executable game play codes, the recreation of wagering game events being associated with a recreated game outcome; comparing the recreation of wagering game events to the plurality of wagering game events; determining if the recreated game outcome is the same as the game outcome of the winning event, and responsive to the recreated game outcome being the same as the game outcome of the winning event, determining if a recreated award value is the same as the award value.

In some embodiments, the verification analysis system monitors a game outcome state or status code and related game session data associated with a transaction identification for the game outcome.

Some embodiments of the invention are directed to an Internet-based online gaming platform which incorporates a security and game protection system and method being configurable to identify the value of a game award to be credited to a player account and notify the platform operator responsive to the value of the game award being greater than a preset threshold value.

It should be understood that online gaming as referred to herein includes any type of game offered online in which receiving a benefit or an award of value, such as a monetary award, is possible. For example, online gaming as used herein may include any wagering game, including casino games, such as slot games, roulette, craps and card games, and e-sports, wherein players may win real money or virtual currency as a game award. Accordingly, a game or game event as used herein may include a slot, roulette, craps or card game outcome, and outcomes of an e-sports wager or contest.

Some embodiments of the invention are directed to an Internet-based online gaming platform which incorporates a security and game protection system and method being configurable to identify the value of a game award to be credited to a player account, notify the platform operator responsive to the value of the game award being greater than a preset threshold value, provide game data relating to the game event involving the game award, and request a verification of the game award.

Some embodiments of the invention are directed to an Internet-based online gaming platform which incorporates a security and game protection system and method being configurable to identify the value of a game award to be credited to a player account, notify the platform operator responsive to the value of the game award being greater than a first preset threshold value, and responsive to the value of the game award being greater than a second preset threshold, provide game event data relating to the game event involving the game award, and request a verification of the game award.

In some embodiments, the game play activity is suspended for the player until the verification of the game award is received. In some embodiments, the ability of the player to use or withdraw the game award is suspended for the player until the verification of the game award is received.

In some embodiments, the game event data relating to the game event involving the game award includes game data generated by the gaming platform in connection with the game event. In some embodiments, the game data includes various transactional and game related information, such as for example, the amount wagered in the game event, the allowable denominations in the game at the time of the game event, the result of a random number generator for the game event, the result of a remote gaming server for the game event, the result the game event, the result of any bonus round or free play involved in the game event, and the player account balance before and after the game event.

In some embodiments, the game event data includes or can be used to generate an independent game response, replay or a simulation of the game event from which the game award is derived. The system actuates the remote gaming server using the same input and/or transactional data, such as the amount wagered, game event history, player history, etc., to generate an independent game response, which should comprise a replay of the actual game event. The independent game response may therefore be displayed to the platform operator as verification of the actual game event and resulting game award or alternatively indicate a game malfunction or malfeasance.

The game event data may also include text or code indicating a history of game event input and output including the game event response and award.

In some embodiments, the game event data is compared with game rules and/or an expected game event data associated with the game award. For example, the game event data may be compared with historical game event data to determine whether the game event data matches with game event data that resulted in a similar or the same game award.

In some embodiments, the notification to the platform operator includes a communication of the game award and one or more selectable links, such as a link to view the game event data or to actuate a game replay. The selectable links may also include a link for verifying the game event and depositing or releasing the game award to be credited to a player account. Any of links may further require entry of a password or satisfying other security features.

Some embodiments of the invention are directed to systems and methods which enable an online gaming platform to: a) compare a game award with a configured threshold award value, during an instance of a game being played by a registered player having a player account; b) detect a game award greater than the threshold value; c) responsive to the detection, generate notification containing information regarding the award and the instance of the game; d) suspend payment of the game award to the player account and continued game play for this player in the instance of the game; e) notify the player and the operator, informing the player the win is subject to verification, and informing the operator a win verification is pending, wherein the notification may include a communication and/or display on a display device; f) enable authorized user verification of the game award, wherein the transaction data in the database relating to the instance of the game is identified from the information received in the notification; g) generate using the transaction data either a simulation of the instance of the game using the transaction data or a display of the transaction data relating to the instance of the game the transaction data (such as the amount wagered, game award, player account balance before and after the award); and h) enable an authorized user to activate payment of the game award to the player account or maintain the suspension.

These features and advantages of the present disclosure may be appreciated by reviewing the following description of the present disclosure, along with the accompanying figures wherein like reference numerals refer to like parts.

BRIEF DESCRIPTION OF DRAWINGS

The accompanying drawings illustrate the embodiments of systems, methods, and other aspects of the disclosure. Any person with ordinary skills in the art will appreciate that the illustrated element boundaries (e.g., boxes, groups of boxes, or other shapes) in the figures represent an example of the boundaries. In some examples, one element may be designed as multiple elements, or multiple elements may be designed as one element. In some examples, an element shown as an internal component of one element may be implemented as an external component in another and vice versa. Furthermore, the elements may not be drawn to scale.

Various embodiments will hereinafter be described in accordance with the appended drawings, which are provided to illustrate, not limit, the scope, wherein similar designations denote similar elements, and in which:

Figure 6:
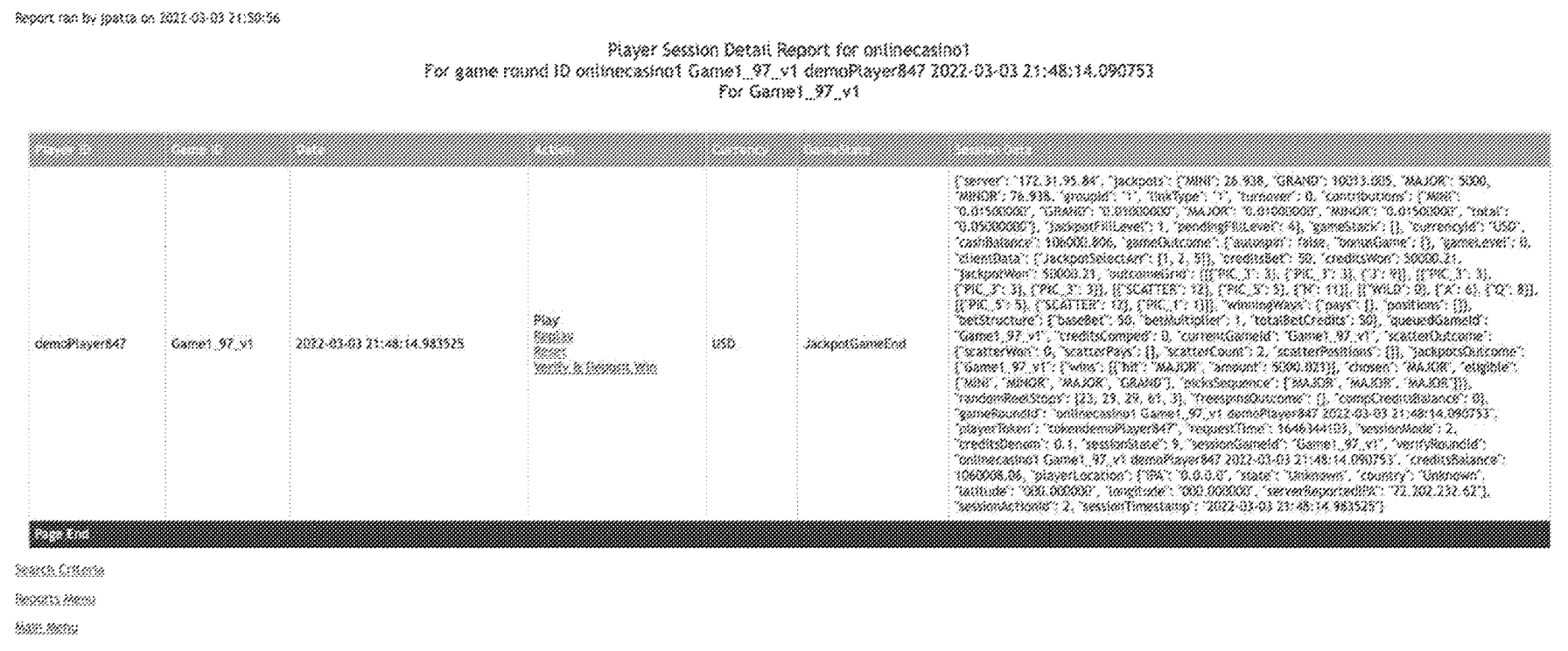

FIG. 6 illustrates a gaming operator display screen triggered in some embodiments of the invention.

Figure 1:
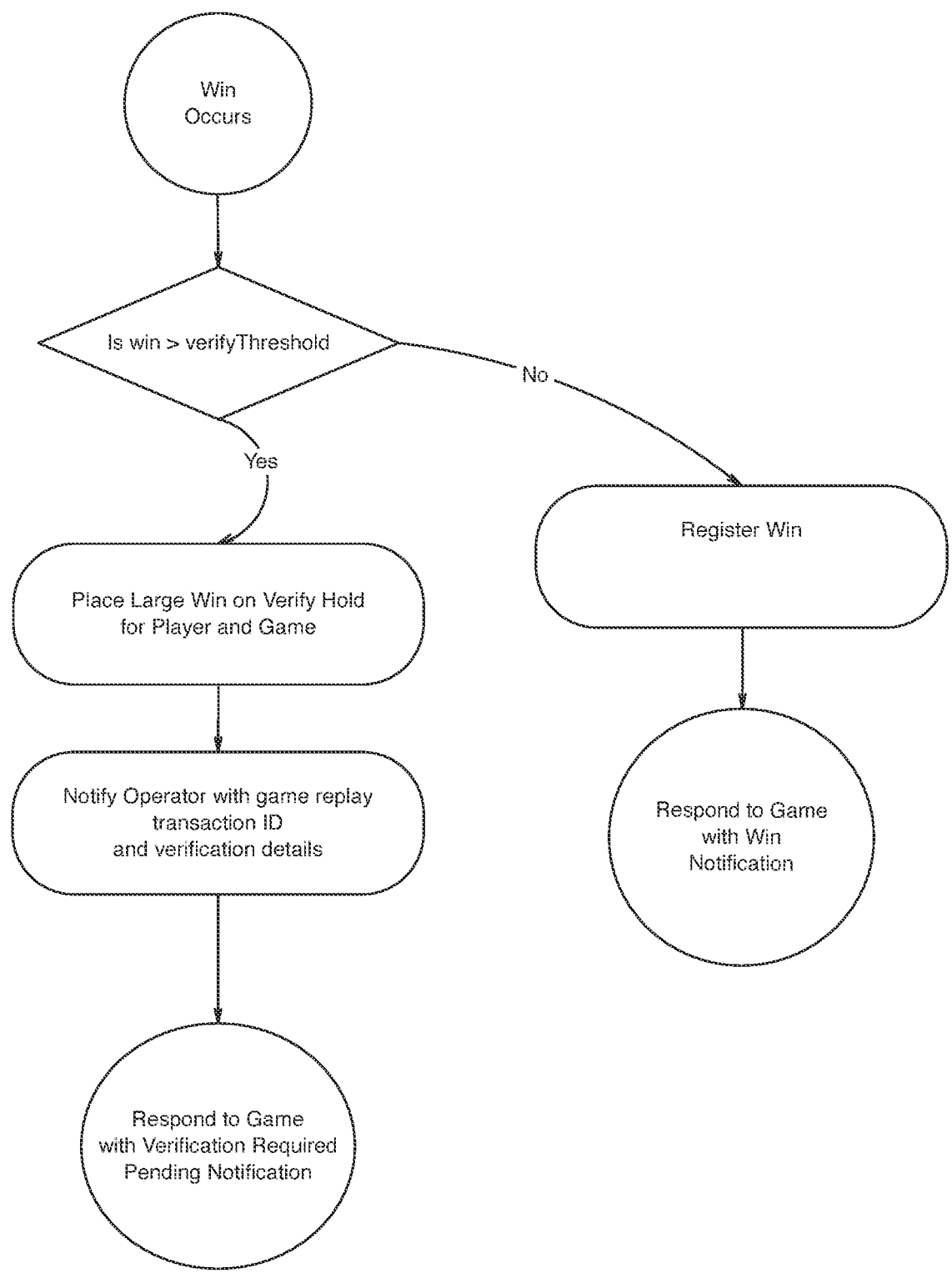
FIGS. 1-4 provide exemplary flow charts configured and constructed according to various embodiments of the invention.
Figure 2:
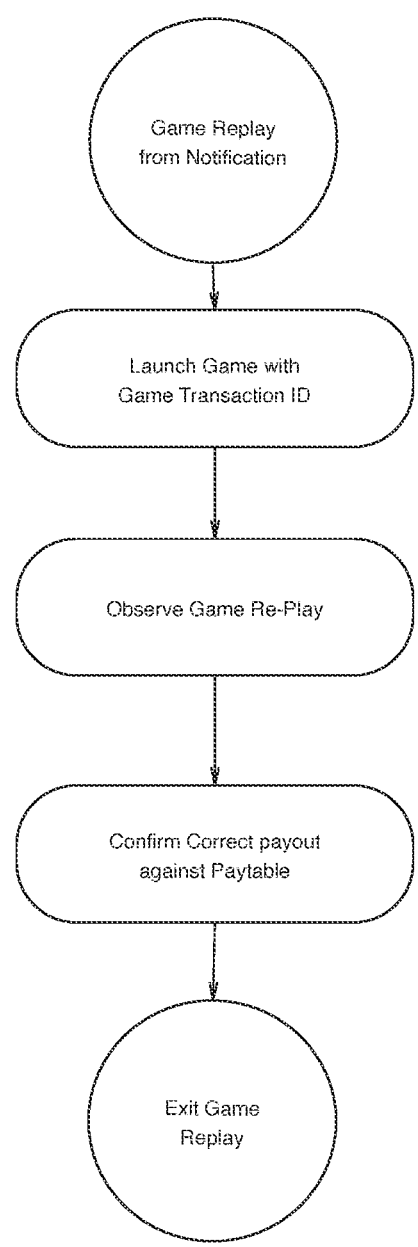
Figure 3:
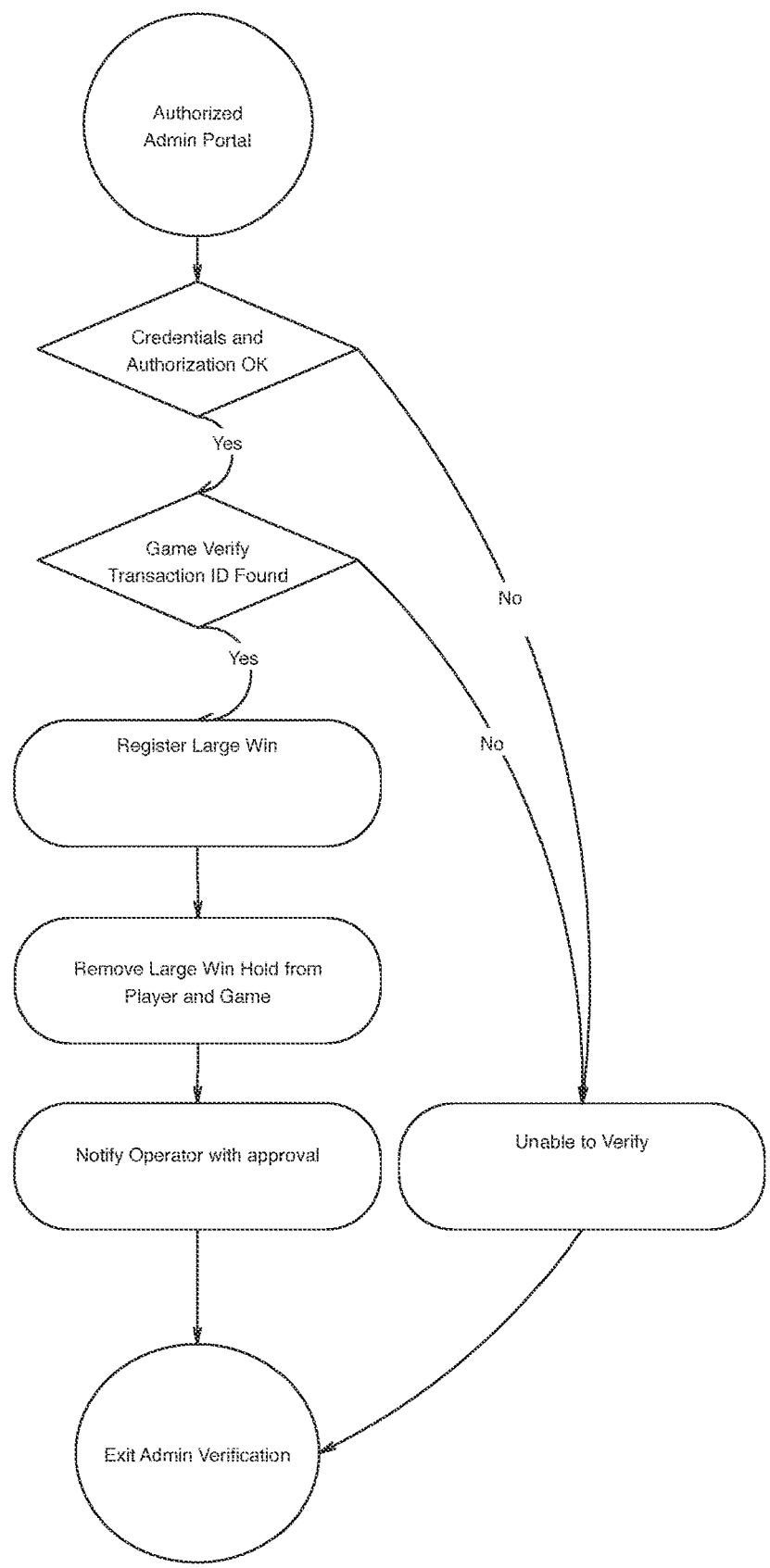
Figure 4:
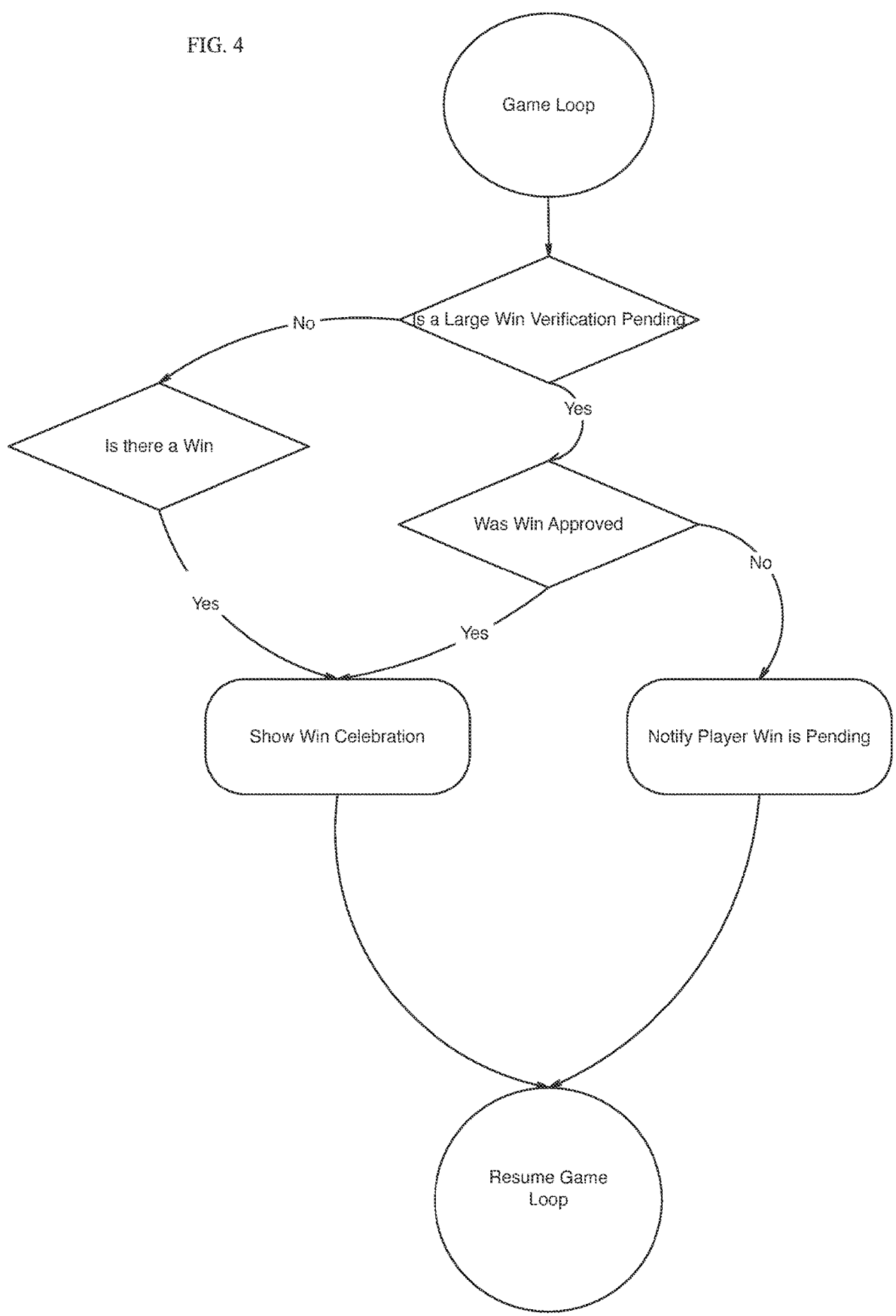

DETAILED DESCRIPTION OF SOME
EMBODIMENTS OF THE INVENTION

The present disclosure is best understood with reference to the detailed figures and description set forth herein. Various embodiments have been discussed with reference to the figures. However, those skilled in the art will readily appreciate that the detailed descriptions provided herein with respect to the figures are merely for explanatory purposes, as the methods and systems may extend beyond the described embodiments. For instance, the teachings presented and the needs of a particular application may yield multiple alternative and suitable approaches to implement the functionality of any detail described herein. Therefore, any approach may extend beyond certain implementation choices in the following embodiments.

References to "one embodiment," "at least one embodiment," "an embodiment," "one example," "an example," "for example," and so on indicate that the embodiment(s) or example(s) may include a particular feature, structure, characteristic, property, element, or limitation but that not every embodiment or example necessarily includes that particular feature, structure, characteristic, property, element, or limitation. Further, repeated use of the phrase "in an embodiment" does not necessarily refer to the same embodiment.

Methods of the present invention may be implemented by performing or completing manually, automatically, or a combination thereof, selected steps or tasks. The term "method" refers to manners, means, techniques, and procedures for accomplishing a given task including, but not limited to, those manners, means, techniques, and procedures either known to or readily developed from known manners, means, techniques, and procedures by practitioners of the art to which the invention belongs. The descriptions, examples, methods, and materials presented in the claims and the specification are not to be construed as limiting but rather as illustrative only. Those skilled in the art will envision many other possible variations within the scope of the technology described herein.

Some embodiments of the invention are generally directed to systems, methods, and apparatus for providing, operating, hosting, and conducting a game outcome verification system capable of operating with and monitoring an online gaming system in which awards of value are won by players.

Certain features of systems of the invention are described below:
1. Creation: player creates an account at an online casino, operated by an operator, administered by authorized users (operator staff);
2. Deposits: player may deposit funds into his player account at the casino, typically using a credit card, anytime, in a fully automated process, but typically when not playing a game;
3. Game activity: player enters a game menu or a lobby, and chooses a game to play game loads and presents last known game "state";
4. Game play: If game allows it, player plays by betting, and pressing spin/draw/play action game responds by taking the bet, deducting it from the player account, if funds are available, and then game determines the outcome, then instead of game posts any wins to the player account, the system compares the win amount with a first and second threshold, wherein the first threshold is less than the second threshold. The aforementioned method steps a-d are first performed for awards above the first threshold, then the game posts any wins to the player account, and game presents the outcome back to the player visually. In the alternative, the method steps a-h are performed for awards above the second threshold before proceeding to post the win to the player account. Players may see a display screen as shown in the attached FIGURE indicating that the game award is under review. Players may continue playing another round, if allowed, and this repeats, until player exits the game, for any reason if player decides to exit, game exits and loads the game menu or casino lobby;
5. Withdrawals: player may choose to withdraw money from his player account, typically to a bank account, anytime, when not playing a game, authorized users using backoffice administration tools will verify the withdrawal, over a certain limit, reviewing play history, deposits and withdrawal history. This process may take several days and is manual, using the administration tools. Authorized users will process the withdrawal once verified and notify player, typically by email.
6. login/logout: any activity above is subject to successful login. player may logout anytime. Authorized users login/logout to the administrative backoffice system.

Thus, in some embodiments, game play is as follows: If game allows it, player plays by betting, and pressing spin/draw/play action game responds by taking the bet, deducting it from the player account, if funds are available, and then game determines the outcome, then compares game award with a configured threshold award value, during an instance of a game being played by a registered player having a player account; detects a game award greater than the threshold value responsive to the detection, generates notification containing information regarding the award and the instance of the game; suspends payment of the game award to the player account and further game play for this player in this game; notifies the player and the operator, informing the player the win is subject to verification, and informing the operator a win verification is pending. For awards smaller than the threshold, game posts any wins to the player account, then game presents the outcome back to the player visually. Player may continue playing another round, if allowed, and this repeats, until player exits the game, for any reason if player decides to exit, game exits and loads the game menu or casino lobby.

The administration may involve features allowing authorized users to perform Win Verification upon notification or ad hoc. Win Verification allows authorized user verification which identifies the transaction data in the database relating to the instance of the game from the information received in the notification and generates either a simulation of the instance of the game using the transaction data or a display of the transaction data relating to the instance of the game the transaction data (including amount wagered, game award, player account balance before and after the award), enables authorized user activating payment of the game award to the player account or maintaining the suspension.

It should be understood that the term "game" as used in the description of this embodiment may include a game plus the remote gaming server (RGS) plus the online operator or casino platform. A game contains all the unique logic math and media for this game. The RGS is the platform that contains the common logic that deals with all games and system integrations, and business rules and method. Such as this one: the actual handling of my method is actually implemented in the RGS, so that the software solution is done just once. Even the administration system, when it performs the Win Verification, it reaches out to the RGS to perform the account updates, and similar common functions. It is the RGS that ultimately queries player account and posts any balances, via its integration to the casino platform, because only the casino platform can manipulate the player accounts. Casino platform hosts the accounts and their lifecycle, and any payments/withdrawal handling.

Game says bet to the RGS. RGS says debit account to the casino platform via its integration API. Casino platform performs the actual debit from payer account.

Game says win to the RGS. RGS says credit account to the casino platform via its integration API. Casino platform performs the actual credit to player account.

Systems and methods of some embodiments of the invention direct the RGS to determine if to Credit, or to force performing of Win Verification, and notifies the player and the operator accordingly, among other things.

This description provides systems and methods for implementing features in gaming applications and platforms. The gaming applications or platforms may be implemented in accordance or in conjunction with one or more of a variety of different types of devices, such as those described herein, including computer-based platforms which may be specially configured for the provision of wagering games, such as electronic gaming machines, or other devices which are not specially configured for the provision of wagering games, such as a smartphone, tablet or computer, but which can be enabled as a platform device through which such gaming applications including the game features of the invention can be made accessible. Embodiments of the invention therefore contemplate a variety of different devices in and through which gaming applications of the invention may be employed, each device having one or more of a plurality of different features, attributes, or characteristics as disclosed herein.

A gaming system as used herein refers to any and all devices that are at least partially user-operable and various configurations including one or more central servers, central controllers, or remote hosts, one or more electronic gaming machines and/or one or more devices which are not specially configured for the provision of a wagering game, such as desktop computers, laptop computers, tablet computers or computing devices, televisions, personal digital assistants (PDAs), mobile telephones such as smart phones, and other mobile computing devices, configured to communicate with one another and/or a central server, central controller or remote host through a communication link, such as a local or wide area data network, closed, intranet or open system or remote link such as the Internet, all of which are collectively referred to herein and encompassed by the term user device.

For example, the gaming system may include a central server, central controller, or remote host, the central server, central controller, or remote host is any suitable computing device (such as a server) that includes at least one processor and at least one memory device or storage device. In some embodiments of the invention a user device includes at least one processor configured to transmit and receive data or signals representing events, messages, commands, or any other suitable information between the user device and the central server, central controller, or remote host. The at least one processor of the user device is configured to execute the events, messages, or commands represented by such data or signals in conjunction with the operation of the user device. Moreover, the at least one processor of the central server, central controller, or remote host is configured to transmit and receive data or signals representing events, messages, commands, or any other suitable information between the central server, central controller, or remote host and the user device. The at least one processor of the central server, central controller, or remote host is configured to execute the events, messages, or commands represented by such data or signals in conjunction with the operation of the central server, central controller, or remote host. It should be appreciated that one, more, or each of the functions of the central server, central controller, or remote host may be performed by the at least one processor.

It should be noted that the process steps and instructions of the embodiments described herein can be embodied in software, firmware, or hardware, and when embodied in software, could be downloaded to reside on and be operated from different platforms used by a variety of operating systems. The embodiments can also be in a computer program product, which can be executed on a computing system.

Figure 5:
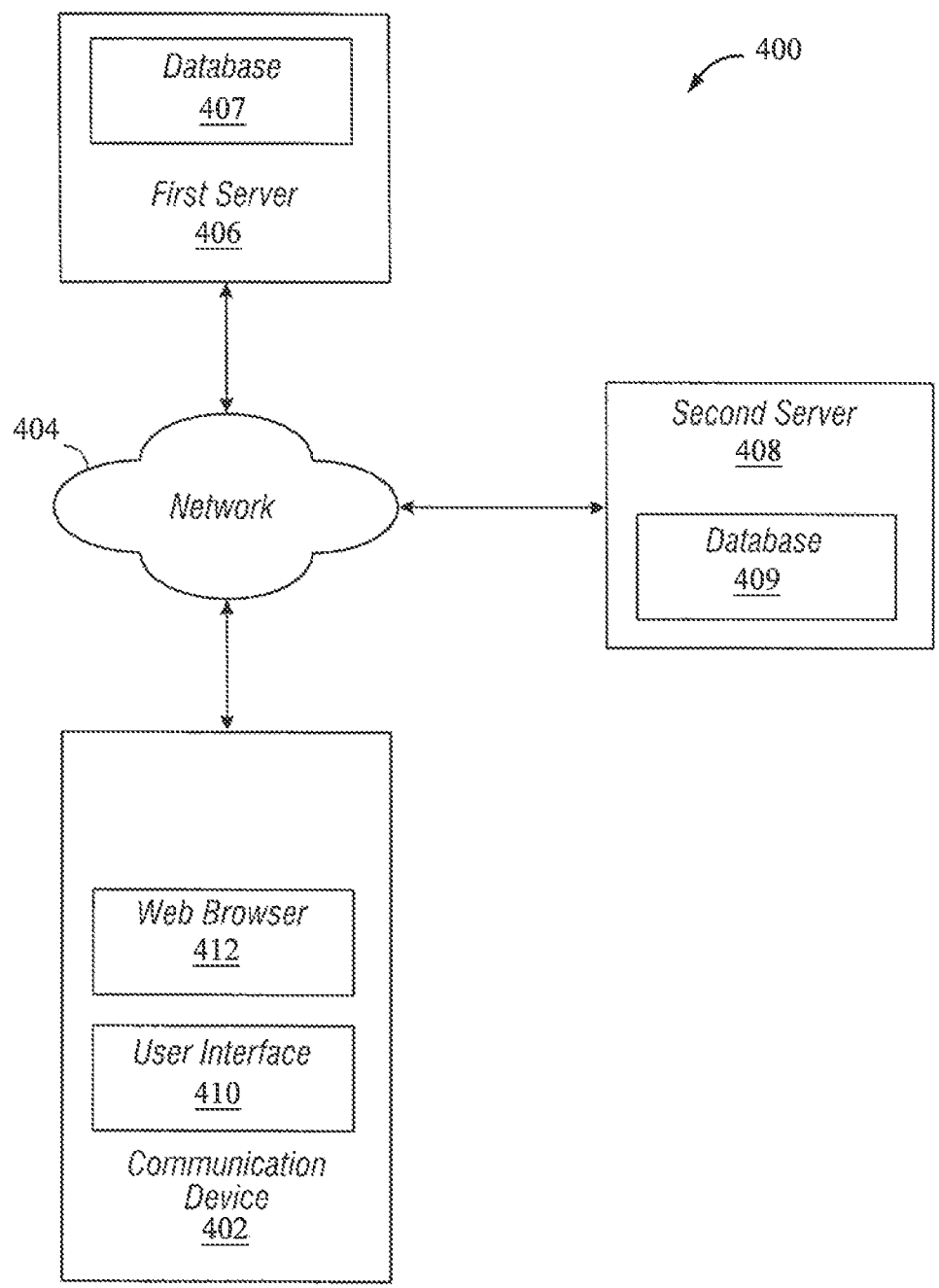
FIG. 5 illustrates an exemplary environment and system for operations and devices in accordance with the disclosed embodiments of the invention.
Figure 7:
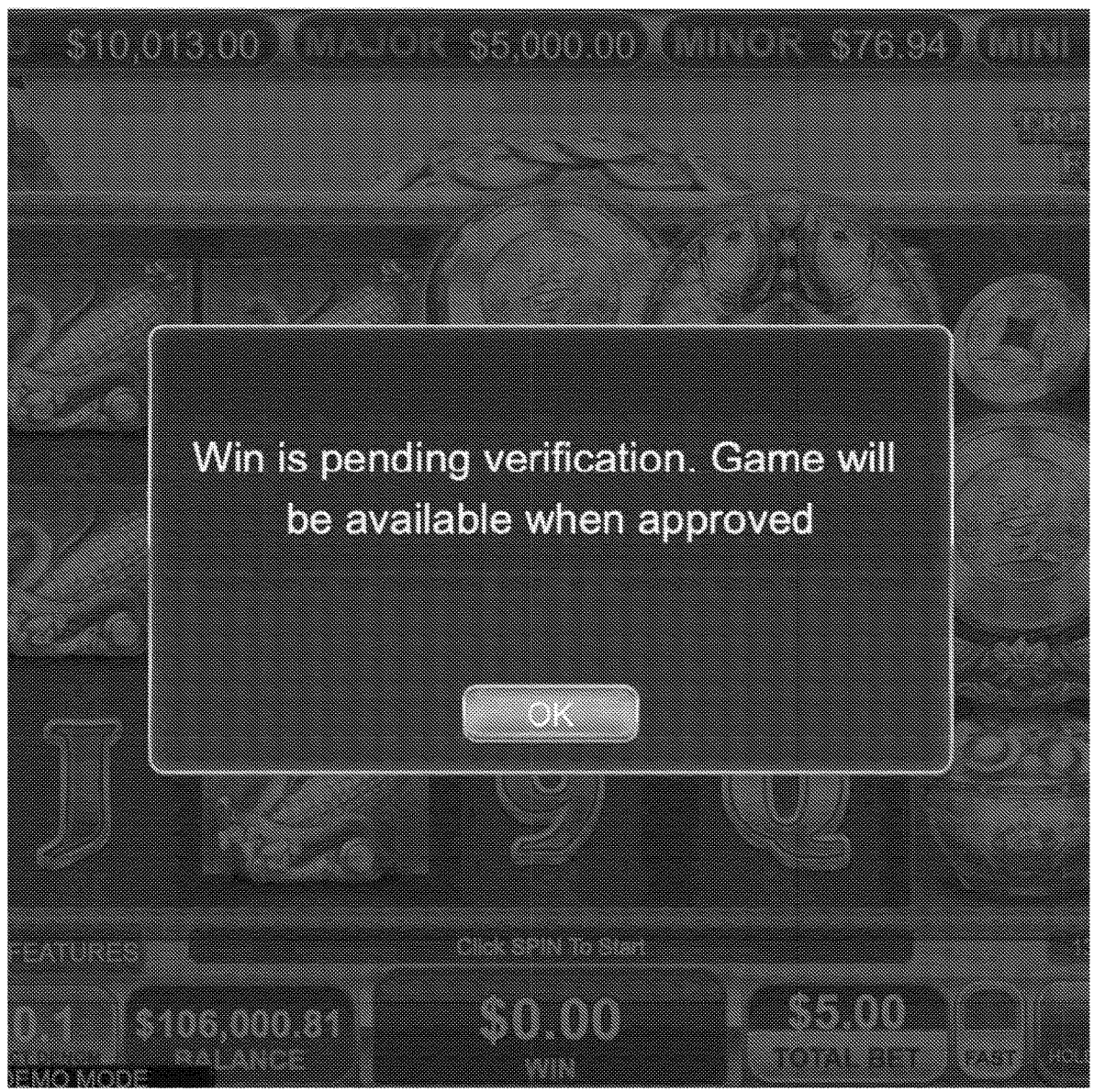
FIG. 7 illustrates a display transmitted to a remote user display device in some embodiments of the invention.

Referring now to FIG. 5, an exemplary system 400 for operations and devices according to some embodiments of the present invention will be discussed. System 400 may include one or more communications/computing devices 402, a data communications network 404, a first server 406 and a second server 408. It can be appreciated that additional servers may be utilized with respect to network 404. It can also be appreciated that in some embodiments, only a single server, such as server 406 may be required. Servers 406 and 408 may each include one or more processors, memory and data storage devices, collectively identified as database 407 and 409, respectively, which are configured to enable game outcome verification and embodiments of the invention as discussed herein and shown in the figures.

The first server 406 may include a database 414 and the second server 408 may include a database 416. Communications devices 402 may communicate with first and second servers 406 and 408 over the network 404, for example, the Internet, through a wireless communications link, an Ethernet connection, a telephone line, a digital subscriber link (DSL), a broadband cable link, client-server link, and/or other wireless links, etc. In this embodiment, first server 406 may be used to operate and process the game engine and random number generator to generate executable game play code while second server 408 processes the executable game play code to enacts game play events on a remote user device in communication with network 404.

Some portions of the disclosure are presented in terms of algorithms (e.g., as represented in flowcharts, prose descriptions, or both) and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic, or optical signals capable of being stored, transferred, combined, compared, and otherwise manipulated. It is convenient at times, principally for reasons of common usage, to refer to these signals as bits, values, elements, symbols, characters, terms, numbers, or the like. Furthermore, it is also convenient at times to refer to certain arrangements of steps requiring physical manipulations or transformation of physical quantities or representations of physical quantities as modules or code devices, without loss of generality. However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing," "computing," "calculating," "determining," "displaying," "determining," or the like, refer to the action and processes of a computer system, or similar electronic computing device (such as a specific computing machine), that manipulates and transforms data represented as physical (electronic) quantities within the computer system memories or registers or other such information storage, transmission or display devices.

Some embodiments also relate to an apparatus for performing the operations herein. Such an apparatus may be specially constructed for the purposes, e.g., a specific computer, or it may comprise a general-purpose computer selectively activated or reconfigured by a computer program stored in the computer. Such a computer program may be stored in a computer-readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Memory can include any of the above and/or other devices that can store information/data/programs and can be a transient or non-transient medium, where a non-transient or non-transitory medium can include memory/storage that stores information for more than a minimal duration. Furthermore, the computers referred to in the specification may include a single processor or may be architectures employing multiple processor designs for increased computing capability.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

While exemplary systems and methods, and applications of methods of the invention, have been described herein, it should also be understood that the foregoing is only illustrative of a few particular embodiments with exemplary and/or preferred features, as well as principles of the invention, and that various modifications can be made by those skilled in the art without departing from the scope and spirit of the invention. Additional information regarding exemplary embodiments of the invention is provided below.

Computer Program

In some embodiments, the methods, systems, and media disclosed herein include at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft® .NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™ and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Mobile Application

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Go, Java™, Javascript, Pascal, Object Pascal, PUP, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, and Windows® Mobile SDK.

Those of skill in the art will recognize that several commercial forums are available for distribution of mobile applications including, by way of non-limiting examples, Apple® App Store, Android™ Market, BlackBerry® App World, Windows® Marketplace for Mobile, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Software Modules

In some embodiments, the methods, systems, and media disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the methods, systems, and media disclosed herein include one or more databases, or use of the same. In view of the disclosure provided herein, those of skill in the art will recognize that many databases are suitable for storage and retrieval of user and player unit information. In various embodiments, suitable databases include, by way of non-limiting examples, relational databases, non-relational databases, object oriented databases, object databases, entity-relationship model databases, associative databases, and XML databases. In some embodiments, a database is internet-based. In further embodiments, a database is web-based.

In still further embodiments, a database is cloud computing-based. In other embodiments, a database is based on one or more local computer storage devices.

General Information Relating to Various Embodiments of the Invention

A controller, computing device, or computer, such as described herein, may include at least one or more processors or processing units and a system memory. The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

In some embodiments, a controller may include a processor, which as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Other aspects and features of the invention can be obtained from a study of the drawings, the disclosure, and the appended claims. The invention may be practiced otherwise than as specifically described within the scope of the appended claims. It should also be noted, that the steps and/or functions listed within the appended claims, notwithstanding the order of which steps and/or functions are listed therein, are not limited to any specific order of operation.

Those skilled in the art will readily appreciate that the systems and methods described herein may be a standalone system, gaming device, gaming machine or incorporated in an existing gaming system or machine. The gaming machine of the invention may include various computer and network related software and hardware, such as programs, operating systems, memory storage devices, data input/output devices, data processors, servers with links to data communication systems, wireless or otherwise, and data transceiving terminals. It should also be understood that any method steps discussed herein, such as for example, steps involving the receiving or displaying of data, may further include or involve the transmission, receipt and processing of data through conventional hardware and/or software technology to effectuate the steps as described herein. Those skilled in the art will further appreciate that the precise types of software and hardware used are not vital to the full implementation of the methods of the invention so long as players and operators thereof are provided with useful access thereto, either through a mobile device, gaming platform, or other computing platform via a local network or global telecommunication network.

Although specific features of various embodiments of the invention may be shown in some drawings and not in others, this is for convenience only. In accordance with the principles of the invention, any feature of a drawing may be referenced and/or claimed in combination with any feature of any other drawing.

Those skilled in the art will readily appreciate that the apparatus described herein may include various computer and network related software and hardware, such as programs, operating systems, memory storage devices, data input/output devices, data processors, servers with links to data communication systems, wireless or otherwise, and data transceiving terminals. Those skilled in the art will further appreciate that the precise types of software and hardware used are not vital to the full implementation of the apparatus of the invention so long as it performs as described in at least one of the embodiments herein.

While exemplary apparatus, systems and methods of the invention have been described herein, it should also be understood that the foregoing is only illustrative of a few particular embodiments with exemplary and/or preferred features, as well as principles of the invention, and that various modifications can be made by those skilled in the art without departing from the scope and spirit of the invention. Therefore, the described embodiments should not be considered as limiting of the scope of the invention in any way. Accordingly, the invention embraces alternatives, modifications and variations which fall within the spirit and scope of the invention as set forth herein, in the claims and any equivalents thereto.

The invention claimed is:

1. A method of verifying online gaming platform awards, comprising:
a verification analysis system configured to monitor a transaction identification, each transaction identification corresponding with a plurality of executable game play codes generated by a game engine in communication with a random number generator generating random output responsive to receiving a game play activation signal from a remote user device during a game session of an interactive wagering game;
a game server configured to receive the plurality of executable game play codes and enact a plurality of wagering game events based on the plurality of the executable game play codes to determine a game outcome, wherein one or more of the plurality of wagering game events is displayed on a remote user display device, and at least one of the one or more of the plurality of wagering game events displayed on the remote user display device is the game outcome of a winning event in the interactive wagering game, the winning event being associated with an award having an award value to be credited to a player account;
determining, via the verification analysis system monitoring the plurality of game events enacted by the game server, whether one of the award value is greater than a threshold award value; the verification analysis system:
identifying the transaction identification associated with the winning event; retrieving the plurality of executable game play codes generated by the game engine associated with the transaction identification and subsequent to receiving the game play activation signal;
actuating the game server to generate a recreation of wagering game events using the retrieved executable game play codes, the recreation of wagering game events being associated with a recreated game outcome;
comparing the recreation of wagering game events to the plurality of wagering game events;
determining if the recreated game outcome is the same as the game outcome of the winning event; and
responsive to the recreated game outcome being the same as the game outcome of the winning event, determining if a recreated award value is the same as the award value.

\* \* \* \* \*